(12) United States Patent
Mayot

(10) Patent No.: US 9,224,219 B2
(45) Date of Patent: Dec. 29, 2015

(54) SYSTEMS AND METHODS FOR PRESENTING A FREE-FORM DRAWING

(71) Applicant: CITRIX SYSTEMS, INC., Fort Lauderdale, FL (US)

(72) Inventor: Frederic Mayot, Oakland, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 256 days.

(21) Appl. No.: 13/723,907

(22) Filed: Dec. 21, 2012

(65) Prior Publication Data

US 2014/0176560 A1 Jun. 26, 2014

(51) Int. Cl.
  *G06T 11/20* (2006.01)
(52) U.S. Cl.
  CPC .................................. *G06T 11/203* (2013.01)
(58) Field of Classification Search
  CPC .... G06F 3/04883; G06T 11/203; G06T 11/20
  USPC ........................................................ 345/442
  See application file for complete search history.

(56) References Cited

U.S. PATENT DOCUMENTS

| | | | |
|---|---|---|---|
| 5,241,654 A | 8/1993 | Kai et al. | |
| 5,309,521 A * | 5/1994 | Matsukawa | 345/469 |
| 5,553,083 A | 9/1996 | Miller | |
| 5,727,002 A | 3/1998 | Miller | |
| 5,764,235 A | 6/1998 | Hunt et al. | |
| 5,826,025 A | 10/1998 | Gramlich | |
| 5,845,265 A | 12/1998 | Woolston | |
| 5,859,647 A * | 1/1999 | Kurumida | 345/442 |
| 5,900,884 A * | 5/1999 | Minami et al. | 345/442 |
| 5,940,083 A * | 8/1999 | Broekhuijsen | 345/442 |
| 5,956,027 A | 9/1999 | Krishnamurthy | |
| 6,081,829 A | 6/2000 | Sidana | |
| 6,167,432 A | 12/2000 | Jiang | |
| 6,204,861 B1 * | 3/2001 | Chen | 345/442 |
| 6,246,758 B1 | 6/2001 | Low | |
| 6,249,291 B1 | 6/2001 | Popp et al. | |
| 6,343,313 B1 | 1/2002 | Salesky et al. | |
| 6,674,435 B1 * | 1/2004 | Payne et al. | 345/442 |

(Continued)

FOREIGN PATENT DOCUMENTS

| | | |
|---|---|---|
| EP | 2 244 229 A2 | 10/2010 |
| EP | 2244229 | 10/2010 |

OTHER PUBLICATIONS

International Search Report and the Written Opinion dated Mar. 27, 2014 from Corresponding PCT Application No. PCT/US2013/074347.

(Continued)

*Primary Examiner* — M Good Johnson
(74) *Attorney, Agent, or Firm* — BainwoodHuang

(57) ABSTRACT

Systems and method for presenting a free-form drawing are described. In some aspects, a first point, a second point, and a third point from an input curve in the free-form drawing are received. A first quadratic Bezier curve is determined, where a control point of the first quadratic Bezier curve includes the second point and endpoints of the first quadratic Bezier curve include the first point and the third point. A first portion of the first quadratic Bezier curve is provided for display, where endpoints of the first portion of the first quadratic Bezier curve include the first point and a second terminal point, and where the first portion of the first quadratic Bezier curve does not include the third point.

23 Claims, 14 Drawing Sheets

(56) References Cited

U.S. PATENT DOCUMENTS

| | | | |
|---|---|---|---|
| 7,013,327 | B1 | 3/2006 | Hickman et al. |
| 7,196,707 | B2 * | 3/2007 | Davignon ............... 345/442 |
| 7,197,535 | B2 | 3/2007 | Salesky et al. |
| 7,310,675 | B2 | 12/2007 | Salesky et al. |
| 7,369,515 | B2 | 5/2008 | Salesky et al. |
| 7,418,476 | B2 | 8/2008 | Salesky et al. |
| 7,426,191 | B2 | 9/2008 | Salesky et al. |
| 7,593,987 | B2 | 9/2009 | Salesky et al. |
| 7,627,663 | B2 | 12/2009 | Salesky et al. |
| 7,715,331 | B2 | 5/2010 | Salesky et al. |
| 7,716,344 | B2 | 5/2010 | Salesky et al. |
| 7,813,304 | B2 | 10/2010 | Salesky et al. |
| 7,822,859 | B2 | 10/2010 | Salesky et al. |
| 7,836,163 | B2 | 11/2010 | Salesky et al. |
| 7,877,489 | B2 | 1/2011 | Salesky et al. |
| 7,934,002 | B2 | 4/2011 | Salesky et al. |
| 2003/0140159 | A1 | 7/2003 | Campbell |
| 2005/0238244 | A1 * | 10/2005 | Uzawa ................ 382/242 |
| 2006/0044305 | A1 | 3/2006 | Katka |
| 2010/0306674 | A1 | 12/2010 | Salesky et al. |
| 2012/0287135 | A1 * | 11/2012 | Pfeifle ................ 345/442 |

OTHER PUBLICATIONS

U.S. Appl. No. 09/523,315, filed Mar. 10, 2000, Salesky.
U.S. Appl. No. 60/014,242, filed Mar. 26, 1996, Salesky.
"CU-SeeMe Software Product," Brought to you by the Cu-SeeMe Development Team of the Advanced Technologies and Planning group of the Network Resources Division of Cornell Information Technologies, pp. 1-8 (1995).
"ORCA Video Conferencing System", Manual Written by the National Oceanic and Atmospheric Administration's Office of Ocean Resources Conservation and Assessment for Operation of the CU-SeeMe System, 26 pages (1995).
Abdel-Waha et al., "XTV: A Framework for Sharing X Window Clients in Remote Synchronous Collaboration," IEEE Conference, pp. 1-15 (1991).
Bolot et al., "Scalable Feedback Control for Multicast Video Distribution in the Internet," SIGCOMM 94, London England, pp. 58-67 (1994).
Chen et al., "Real Time Video and Audio in the World Wide Web", 1995.
Cox, "Global Schoolhouse Project," http://www.virtualschool.edu/mon/academia (2004).
Crowley et al., "MMConf: An Infrastructure for Building Shared Multimedia Applications," Proceedings of the 1990 ACM Conference on Computer-Supported Cooperative Work, pp. 329-342 (1990).
Delgrossi et al., "Media Scaling for Audiovisual Communication with the Heidelberg Transport System," Conference Proceedings of the first ACM International Conference on Multimedia, pp. 99-104 (1993).
Dorcey, "CU-SeeMe Desktop Videoconferencing Software," Connexions The Interoperability Report, 9: 42-45 (1995).
Ensor et al., "Control Issues in Multimedia Conferencing," IEEE Conference, pp. 133-143 (1991).
Ensor et al., "The Rapport Multimedia Conferencing System—A Software Overview," Proceedings of the 2nd IEEE Conference, pp. 52-58 (1988).
Maly et al., "Mosaic + XTV = CoReview," Computer Networks and ISDN Systems, pp. 1-19 1995.
McCanne et al., "Receiver-Driven Layered Multicast," ACM SIGCOMM, pp. 1-14.
Sattler, "Internet TV with CU-SeeMe", Book, 323 pages (1995).
Savetz et al., "MBONE: Multicasting Tomorrow's Internet," IDG Books Worldwide, Inc., (1996).
Friskin, "Efficient Curve Fitting," Journal of Graphics Tools, 13(2):37-37, 2008.
iTunes Preview; "iTunes is the World's Easiest way to Organize and Add to Your Digital Media Collection," Penultimate, by Evernote, 3 pages, Downloaded from the Website, https://itunes.apple.com/us/app/penultimate/id354098826?mt=8.
iTunes Preview; "iTunes is the World's Easiest way to Organize and Add to Your Digital Media Collection," Paper by FiftyThree Inc., 3 pages, Downloaded from the Website, https://itunes.apple.com/us/app/paper-by-fiftythree/id506003812?mt=8.
Glassner, "Graphics Gems," Academic Press Inc., 833 pages (Sep. 1990) can be downloaded from Amazon Books at: http://www.amazon.com/Graphics-Gems-Andrew-S-Glassner/dp/0122861655/ref=sr_1_2?ie=UTF8&qid=1352132159&sr=8-2&keywords=Graphics+Gem.
US 5,715,404, 02/1998, Katseff et al. (withdrawn)

* cited by examiner

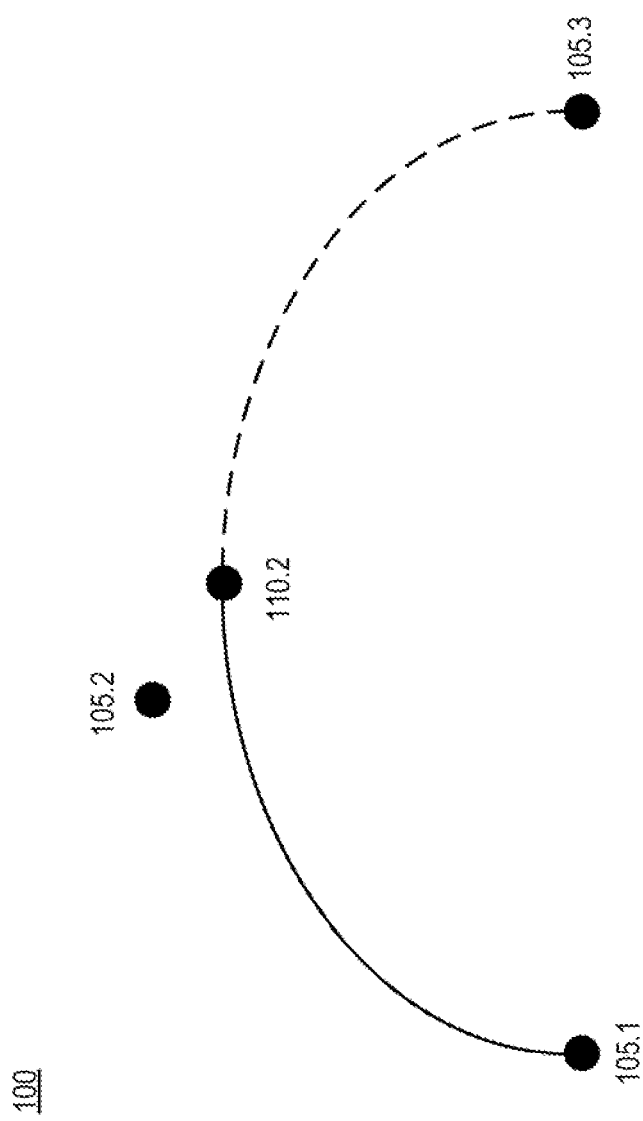

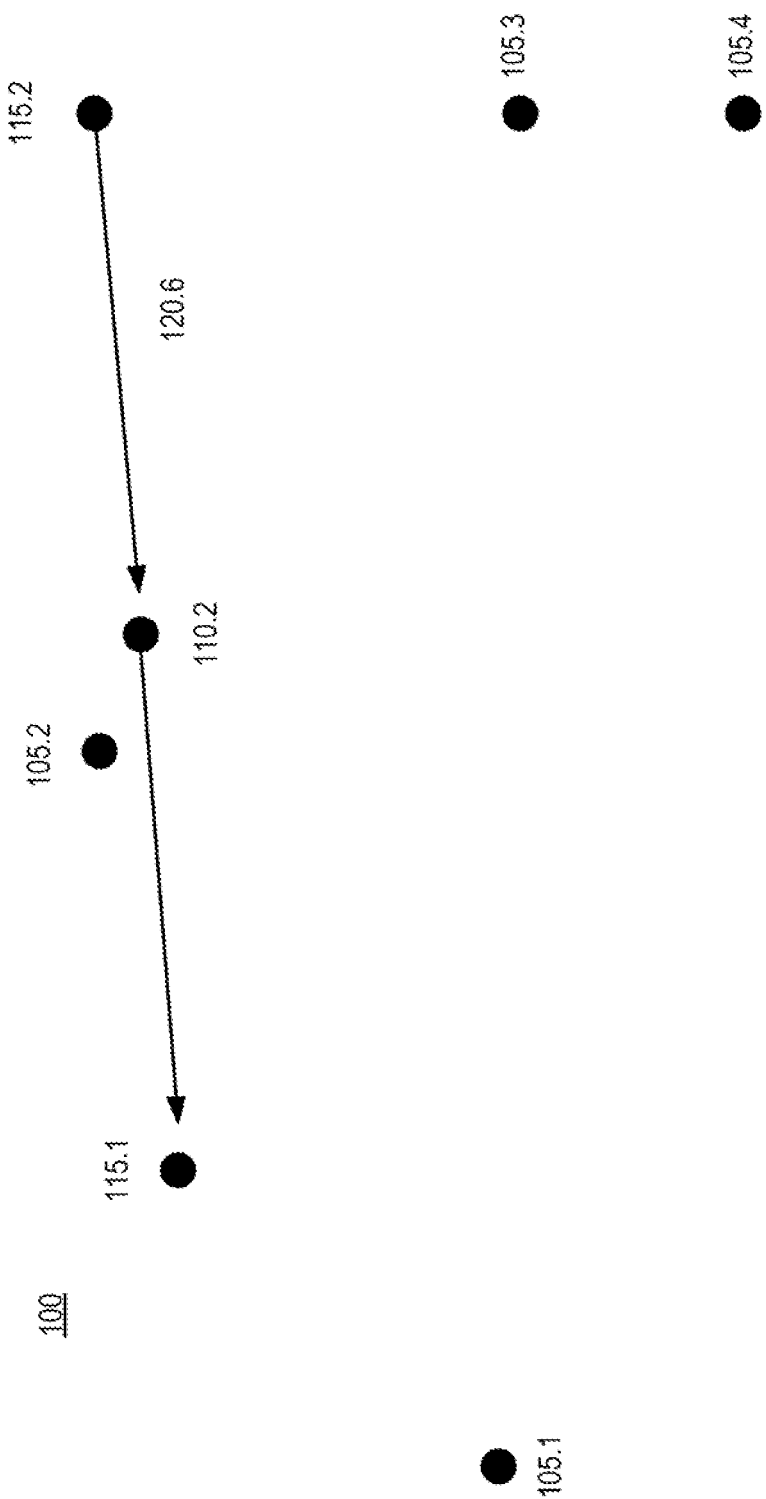

SYSTEMS AND METHODS FOR PRESENTING A FREE-FORM DRAWING

FIELD OF THE INVENTION

The subject technology relates generally to user interfaces. More specifically, the subject technology relates to presenting a free-form drawing.

BACKGROUND OF THE INVENTION

Oftentimes, a user making a drawing using a pen and paper can easily draw smooth lines and curves. However, making a smooth drawing using a touch screen or other electronic device (e.g., a mouse operating in conjunction with a non-touch screen) may be more difficult as some touch screens may receive touch input at low resolution (e.g., 60 frames per second), making curves or lines input to the touch screen not appear smooth or continuous.

SUMMARY OF THE INVENTION

In some aspects, a computer-implemented method for presenting a free-form drawing is provided. The method includes receiving a first point, a second point, and a third point from an input curve in the free-form drawing. The method includes determining a first quadratic Bezier curve, where a control point of the first quadratic Bezier curve includes the second point and endpoints of the first quadratic Bezier curve include the first point and the third point. The method includes providing for display of a first portion of the first quadratic Bezier curve, where endpoints of the first portion of the first quadratic Bezier curve include the first point and a second terminal point, and where the first portion of the first quadratic Bezier curve does not include the third point. The method includes receiving a fourth point from the input curve. The method includes determining a second control point, the second control point including an intersection of a first line and a second line, the first line including a control point of the first portion of the first quadratic Bezier curve and the second terminal point, the second line including the third point and the fourth point. The method includes determining a second quadratic Bezier curve, where a control point of the second quadratic Bezier curve includes the second control point and endpoints of the second quadratic Bezier curve include the second terminal point and the fourth point. The method includes providing for display of a first portion of the second quadratic Bezier curve, where endpoints of the first portion of the second quadratic Bezier curve include the second terminal point and a third terminal point, and where the first portion of the second quadratic Bezier curve does not include the fourth point.

In some aspects, a non-transitory computer-readable medium for presenting a free-form drawing is provided. The computer-readable medium includes instructions. The instructions include code for receiving a first point, a second point, and a third point from an input curve in the free-form drawing. The instructions include code for determining a first quadratic Bezier curve, where a control point of the first quadratic Bezier curve includes the second point and endpoints of the first quadratic Bezier curve include the first point and the third point. The instructions include code for providing for display of a first portion of the first quadratic Bezier curve, where endpoints of the first portion of the first quadratic Bezier curve include the first point and a second terminal point, and where the first portion of the first quadratic Bezier curve does not include the third point.

In some aspects, a system for presenting a free-form drawing is provided. The system includes one or more processors and a memory. The memory includes instructions. The instructions include code for receiving a first point, a second point, and a third point from an input curve in the free-form drawing. The instructions include code for determining a first quadratic Bezier curve, where a control point of the first quadratic Bezier curve includes the second point and endpoints of the first quadratic Bezier curve include the first point and the third point. The instructions include code for providing for display of a first portion of the first quadratic Bezier curve, where endpoints of the first portion of the first quadratic Bezier curve include the first point and a second terminal point, and where the first portion of the first quadratic Bezier curve does not include the third point. The instructions include code for receiving a fourth point from the input curve. The instructions include code for determining a second control point, the second control point including an intersection of a first line and a second line, the first line including a control point of the first portion of the first quadratic Bezier curve and the second terminal point, the second line including the third point and the fourth point. The instructions include code for determining a second quadratic Bezier curve, where a control point of the second quadratic Bezier curve includes the second control point and endpoints of the second quadratic Bezier curve include the second terminal point and the fourth point. The instructions include code for providing for display of a first portion of the second quadratic Bezier curve, where endpoints of the first portion of the second quadratic Bezier curve include the second terminal point and a third terminal point, and where the first portion of the second quadratic Bezier curve does not include the fourth point.

BRIEF DESCRIPTION OF THE DRAWINGS

The foregoing discussion will be understood more readily from the following detailed description of the invention, when taken in conjunction with the accompanying drawings, in which:

FIG. 1A illustrates a first exemplary curve in a free-form drawing.

FIG. 1E illustrates third exemplary vectors associated with a curve in a free-form drawing.

DETAILED DESCRIPTION

Figure 1B:
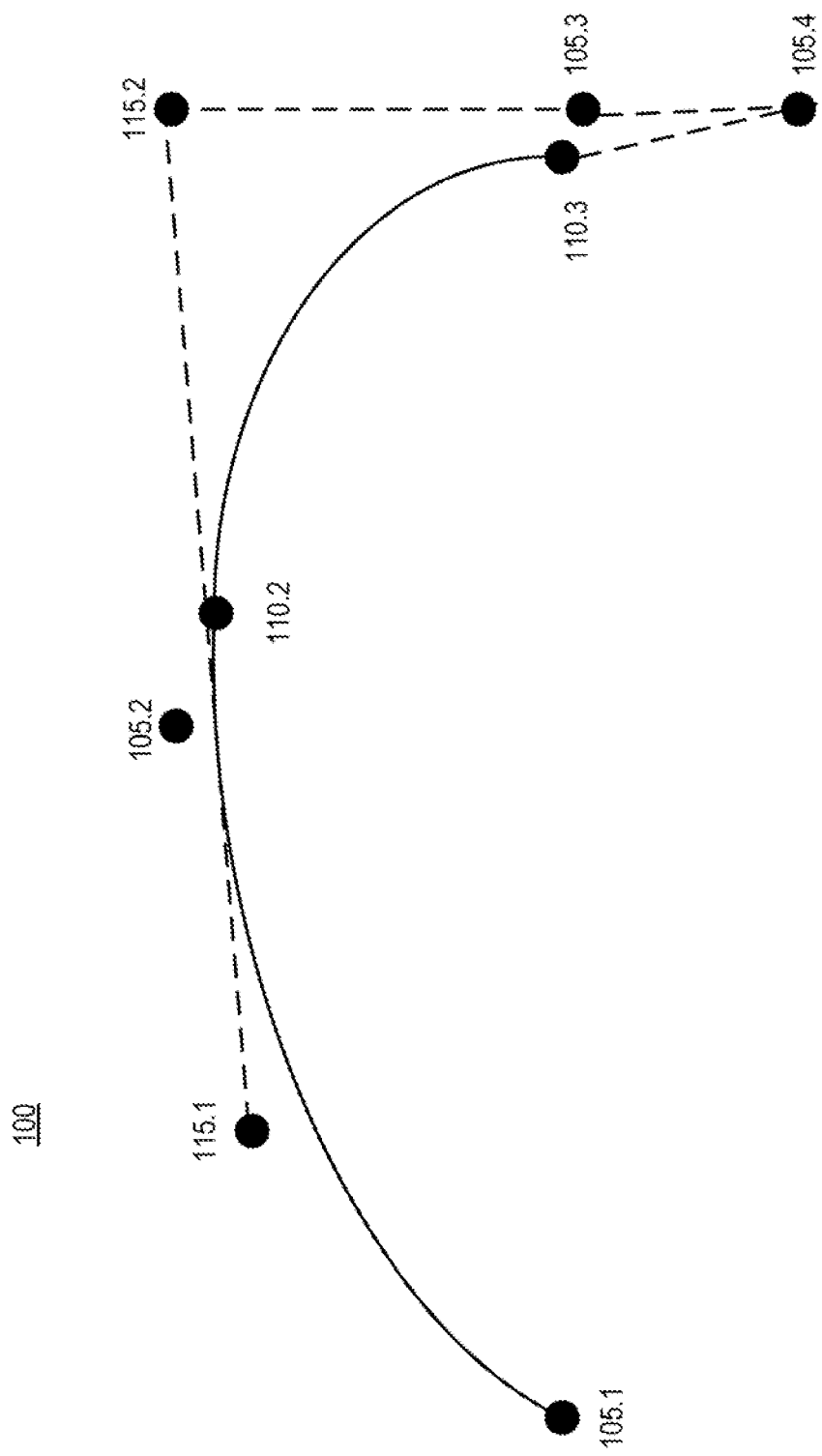
FIG. 1B illustrates a second exemplary curve in a free-form drawing.

As set forth above, a new approach for presenting a free-form drawing that is input using an input device and presented on a screen or other display device may be desirable.

The subject technology provides techniques for presenting a curve that is input within a free-form drawing entered using an input device and presented on a screen or other display device. The screen can be a touch screen or screen operated in conjunction with a mouse, a joystick, or any other input device. As used herein, the term "curve" encompasses its plain and ordinary meaning including, but not limited to a path displayed via a display device (e.g., a screen) derived based on a time series of points received via operation of an input device (e.g., a finger, a stylus, or a mouse) while entering a drawing, a straight line, a crooked line, a shape, etc. In some aspects, while drawing a curve, the input device may not be taken or lifted off the screen or a "mousedown" may not be terminated. A displayed curve may appear as a path from a beginning point to an ending point. The displayed curve may be represented, in memory, as a continuous Bezier curve, but may be displayed on discrete pixels via rasterization. As used herein, the term "mousedown" encompasses its plain and ordinary meaning including but not limited to a primary mouse button being held down (e.g., by a finger). The primary mouse button may be, for example, a single button on a single button mouse or a button configured to be operated by a right index finger of a user in a right handed mouse with multiple buttons.

According to some aspects, a computer receives, via an input device, a first point, a second point, and a third point from an input curve in a free-form drawing. The input curve may correspond to a path taken by an input device (e.g., a finger, a stylus, or a mouse). Each point may correspond to one or more pixels or a location on the screen. The first point may be entered before the second point, which may be entered before the third point. The computer determines a first quadratic Bezier curve having a control point at the second point and endpoints at the first point and the third point. The computer provides for display, on the screen, of a first half of the first quadratic Bezier curve, which extends from the first point to a second terminal point, approximately halfway along the first quadratic Bezier curve between the first point and the third point. As used herein, the phrase "approximately halfway" encompasses its plain and ordinary meaning including but not limited to between 35% and 65% of the way.

The computer receives a fourth point from the input curve. The computer determines a second control point. The second control point is at an intersection of a first line and a second line. The first line includes the control point of the first half of the first quadratic Bezier curve and the second terminal point. The second line includes the third point and the fourth point. The computer determines a second quadratic Bezier curve. The second quadratic Bezier curve has a control point at the second control point and endpoints at the second terminal point and the fourth point. The computer provides for display, on the screen, of a first half of the second quadratic Bezier curve, which extends from the second terminal point to a third terminal point, halfway along the second quadratic Bezier curve between the second terminal point and the fourth point.

As used herein, the phrase "quadratic Bezier curve" encompasses its plain and ordinary meaning, including but not limited to a curve that can be expressed according to equations (1) or (2) below, where equation (1) defines the quadratic Bezier curve and equation (2) is derived from and equivalent to equation (1).

$$B(t)=(1-t)[(1-t)P_0+tP_1]+t[(1-t)P_1+tP_2], t \in [0,1] \quad (1)$$

$$B(t)=(1-t)^2 P_0 + 2(1-t)tP_1 + t^2 P_2, t \in [0,1]. \quad (2)$$

In equations (1) and (2), t is a parameterization variable between 0 and 1. B(t) represents the quadratic Bezier curve. $P_0$ and $P_2$ are the endpoints of the quadratic Bezier curve. $P_1$ is the control point of the quadratic Bezier curve. A first derivative B'(t) of the quadratic Bezier curve B(t) can be expressed according to equation (3) below.

$$B'(t)=2(1-t)(P_1-P_0)+2t(P_2-P_1). \quad (3)$$

Based on equation (3), the tangents to the curve B(t) at $P_0$ and $P_2$ intersect at $P_1$. As t increases from 0 to 1, the curve B(t) departs from $P_0$ in the direction of $P_1$, then bends to arrive at $P_2$ in the direction from $P_1$.

Advantageously, the subject technology provides a real-time and online technique for presenting a curve in a free-form drawing, improving the user experience and making the user experience of drawing on a screen device with a finger or stylus similar to that of drawing on a paper with a pen. As used herein, the term "real-time" encompasses its plain and ordinary meaning including, but not limited to that the curve is displayed shortly after the curve is input by the user, without any intentional delay by the processing system (but accounting for delay due to limited processing speed of the hardware). As used herein, the term "online" encompasses its plain and ordinary meaning, including, but not limited to not displaying a temporary portion of the curve that is later replaced by a different portion of the curve. In other words, once a portion of the curve is displayed on the screen, the portion is not replaced unless the user erases or takes another affirmative action to remove the portion.

According to some aspects, the presented curve is $C^1$ continuous. As used herein, the class $C^0$ includes each continuous function. The class $C^1$ is the class of functions whose first derivative is a function in the class $C^0$. Thus, in other words, the presented curve has a continuous first derivative. In some aspects, the presented curve may not be $C^1$ continuous or may have one or more breaks in $C^1$ continuity. In some aspects, a user may intentionally draw a curve that is not $C^1$ continuous. For example, the user may draw a perfect "V."

FIG. 1A illustrates a first exemplary curve in a free-form drawing 100.

The free-form drawing 100 may be entered, for example, by a user providing input for a screen with an input device (e.g., a finger, a stylus, or a mouse) at points 105.1, 105.2, and 105.3. The user may make a continuous path with the input device and the driver for a component of a computer (e.g., a touch screen or a mouse) receiving the input via the input device may provide indications that the path taken by the input device includes the points 105.1, 105.2, and 105.3. In some cases, the driver for the component of the computer may be inaccurate, causing imperfections in the displayed curve as described above. In response, a computer generates a quadratic Bezier curve from point 105.1 to point 105.3 with a control point at point 105.2. The approximate midpoint of the quadratic Bezier curve is point 110.2. As a result of these input points, the part of the quadratic Bezier curve from point 105.1 to point 110.2 is drawn on the screen, as illustrated by the filled-in line from point 105.1 to point 110.2.

As used herein, the phrase "approximate midpoint of the quadratic Bezier curve," encompasses its plain and ordinary meaning including but not limited to the point on the Bezier curve B(t), where t=0.5, t≈0.5, or 0.35≤t≤0.65. The parameterization variable t of the Bezier curve B(t) varies between 0 and 1 along the curve B(t).

FIG. 1B illustrates a second exemplary curve in the free-form drawing 100.

As shown, in FIG. 1B, the user has provided input (e.g., via a touch screen or a mouse) for the screen at a fourth point 105.4 in addition to the first three points 105.1-105.3. In response, the computer determined point 115.1 to be the control point of the quadratic Bezier curve between points 105.1 and 105.2. Point 115.2 is determined to be the control point of the new quadratic Bezier curve to be drawn in response to the input of point 105.4, the curve from point 110.2 to point 110.3. Point 115.2 corresponds to the intersection point of a first line and a second line. The first line includes the points 115.1 and 110.2. The second line includes the points 105.3 and 105.4. The computer determines a quadratic Bezier curve having a control point at point 115.2 and endpoints at points 110.2 and 105.4. As previously, the computer determines the approximate midpoint of the new quadratic Bezier curve, halfway between point 110.2 and 105.4, as point 110.3. The computer then draws the portion of the new quadratic Bezier curve from point 110.2 to point 110.3.

FIG. 1B illustrates one possible technique for completing the curve in response to the input of the fourth point 105.4. However, in some cases, completing the curve as described in conjunction with FIG. 1B may not be advantageous, as such a completion may lead to an awkward looking curve. FIGS. 1C-1F illustrate various values that may be used to determine that a different technique for completing the curve, for example, as illustrated in FIG. 1G, may be desirable.

Figure 1C:
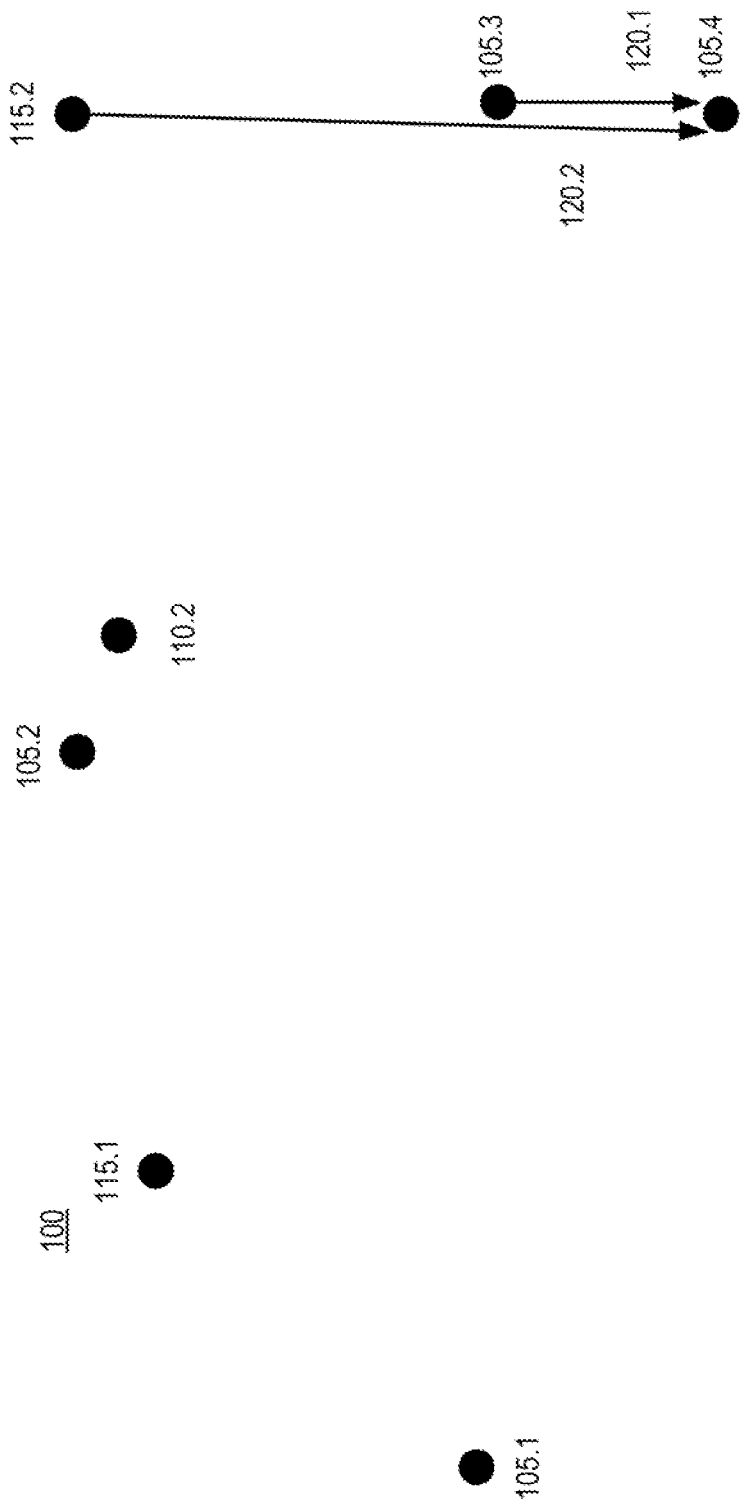
FIG. 1C illustrates first exemplary vectors associated with a curve in a free-form drawing.

FIG. 1C illustrates first exemplary vectors 120.1 and 120.2 associated with the curve in the free-form drawing 100.

Vector 120.1 extends from the third input point 105.3 of the curve to the fourth input point 105.4 of the curve. Vector 120.2 extends from the new control point 115.2 to the fourth input point 105.4 of the curve. If the dot product of vectors 120.1 and 120.2 is less than zero, the curve completion technique described in conjunction with FIG. 1G may be used in place of that described in conjunction with FIG. 1B.

Figure 1D:
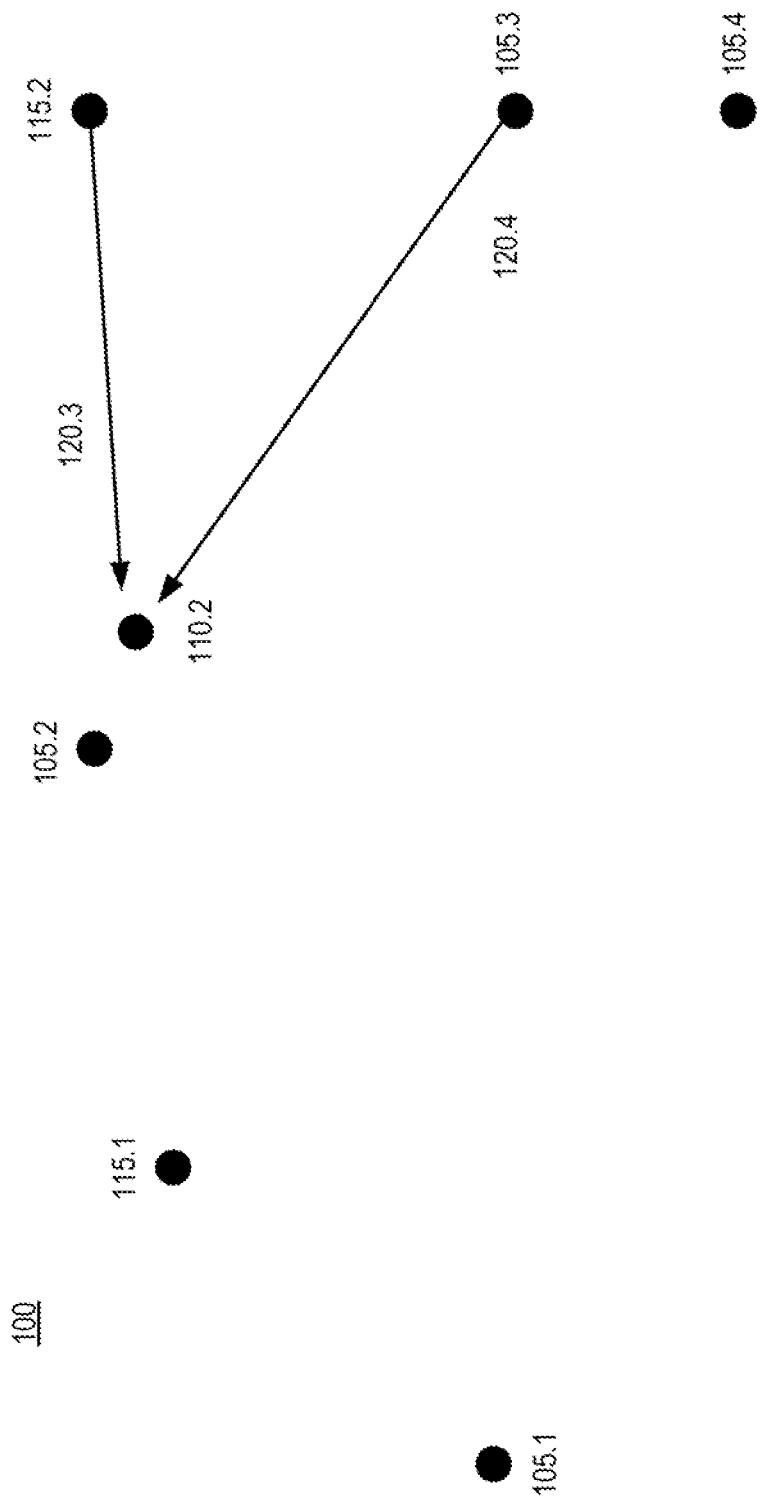
FIG. 1D illustrates second exemplary vectors associated with a curve in a free-form drawing.

FIG. 1D illustrates second exemplary vectors 120.3 and 120.4 associated with the curve in the free-form drawing 100.

Vector 120.3 extends from the third input point 105.3 of the curve to the second terminal point 110.2. Vector 120.4 extends from the new control point 115.2 to the second terminal point 110.2. If the dot product of vectors 120.3 and 120.4 is less than zero, the curve completion technique described in conjunction with FIG. 1G may be used in place of that described in conjunction with FIG. 1B.

FIG. 1E illustrates third exemplary vectors 120.5 and 120.6 associated with the curve in the free-form drawing 100.

Vector 120.5 extends from the second terminal point 110.2 to the control point 115.1 of the quadratic Bezier curve from point 105.1 to point 110.2. Vector 120.6 extends from the new control point 115.2 to the second terminal point 110.2. If the dot product of vectors 120.5 and 120.6 is less than zero, the curve completion technique described in conjunction with FIG. 1G may be used in place of that described in conjunction with FIG. 1B.

Figure 1F:
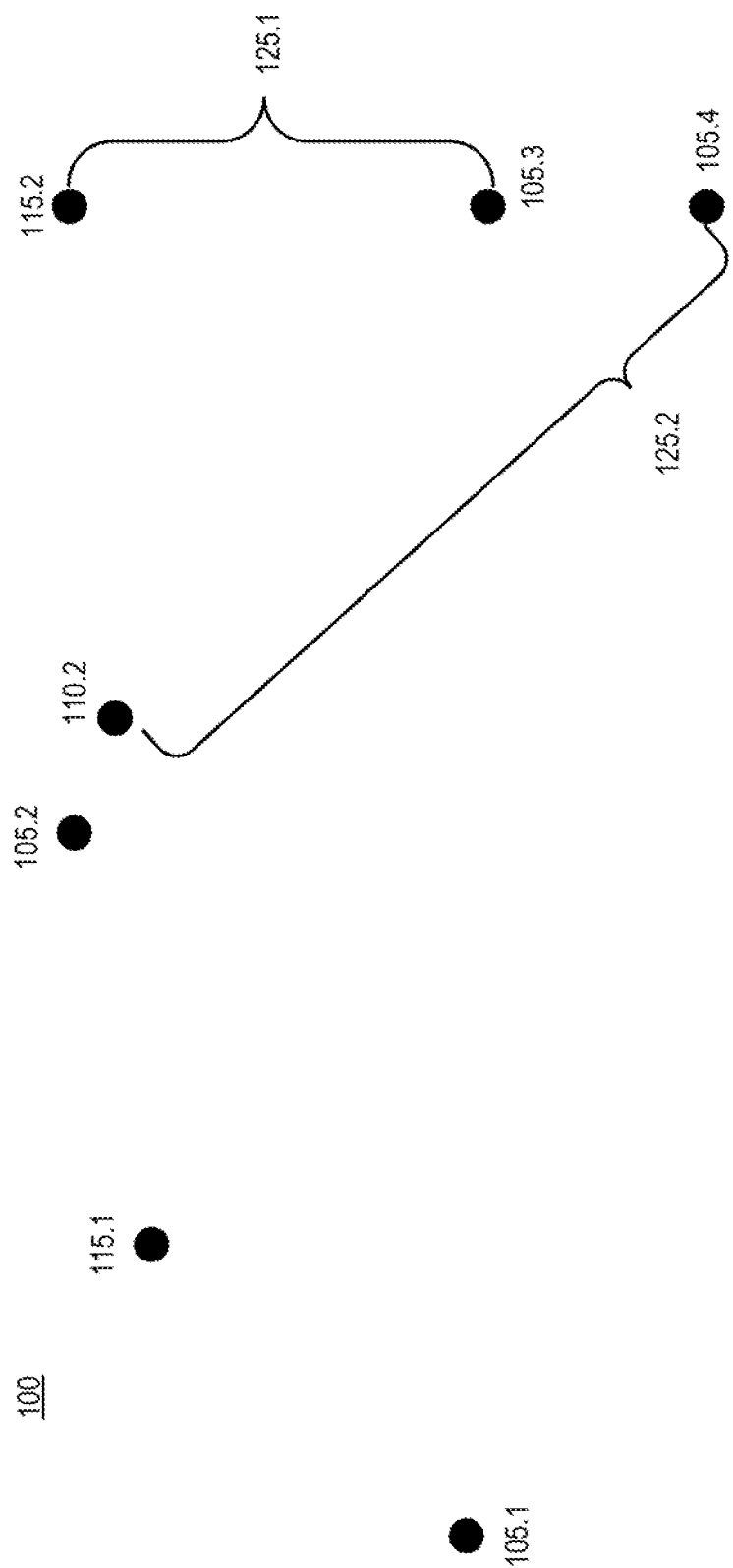
FIG. 1F illustrates exemplary distances associated with a curve in a free-form drawing.
Figure 1G:
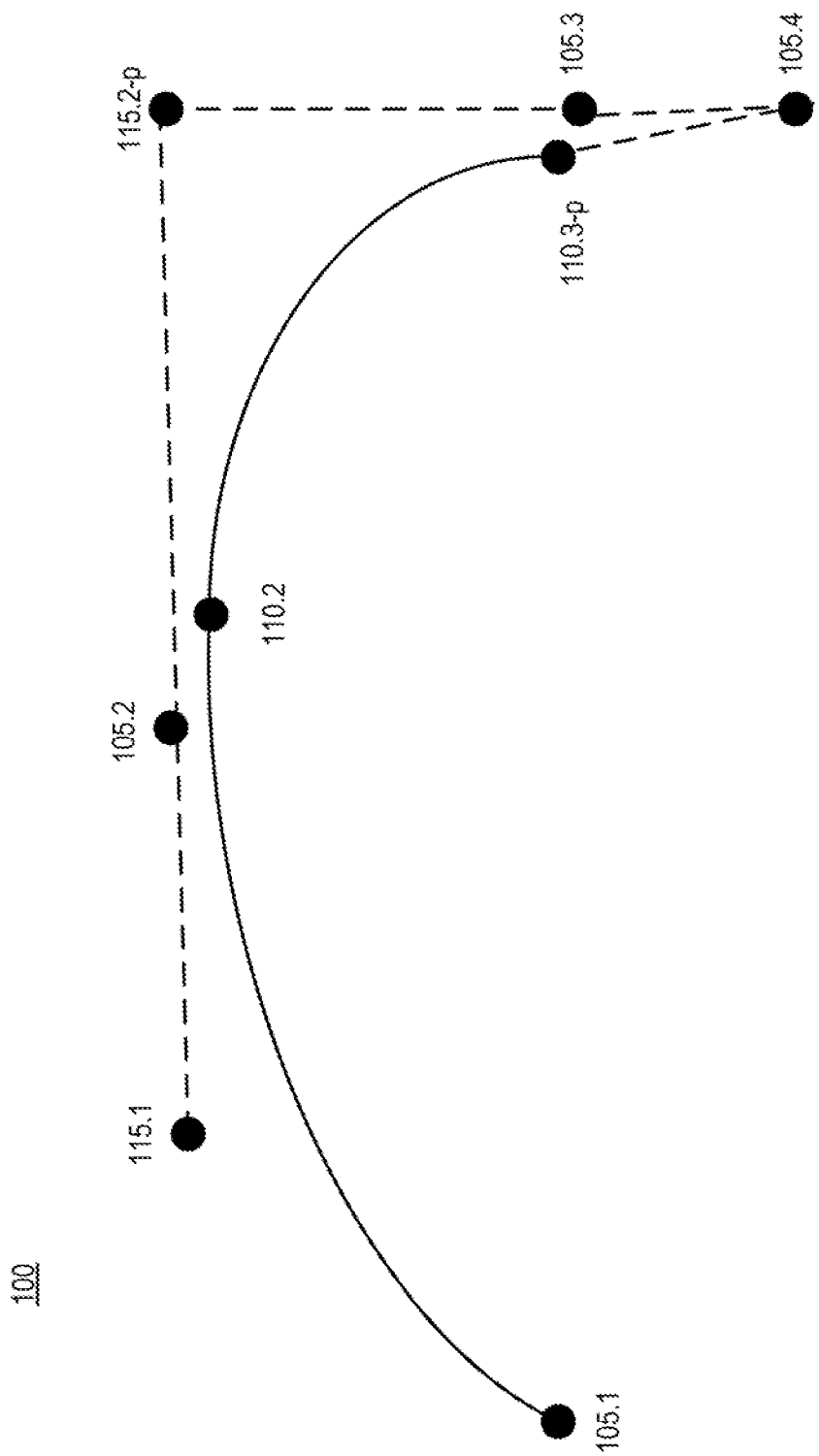
FIG. 1G illustrates a third exemplary curve in a free-form drawing.

FIG. 1F illustrates exemplary distances 125.1 and 125.2 associated with a curve in a free-form drawing 100.

Distance 125.1 represents a distance between the new control point 115.2 and the third point 105.3. Distance 125.2 represents the distance between the second terminal point 110.2 and the fourth point 105.4. If the distance 125.1 exceeds the distance 125.2, the curve completion technique described in conjunction with FIG. 1G may be used in place of that described in conjunction with FIG. 1B.

FIG. 1G illustrates a third exemplary curve in the free-form drawing 100.

As shown, in FIG. 1G, the user has touched the screen at a fourth point 105.4 in addition to the first three points 105.1-105.3, and the computer has determined that at least one of the conditions described in conjunction with FIGS. 1C-1F applies. In response, the computer determines point 115.1 to be the control point of the quadratic Bezier curve between points 105.1 and 105.2. Point 115.2-$p$ is determined to be the control point of the new quadratic Bezier curve to be drawn in response to the input of point 105.4, the curve from point 110.2 to point 110.3-$p$. Point 115.2-$p$ corresponds to the intersection point of a first prime line and a second line. The first prime line includes the points 115.1 and 105.2 (rather than point 110.2 in the first line described in conjunction with FIG. 1B). The second line includes the points 105.3 and 105.4. The computer determines a quadratic Bezier curve having a control point at point 115.2 and endpoints at points 110.2 and 105.4. As previously, the computer determines the approximate midpoint of the new quadratic Bezier curve, halfway between point 110.2 and 105.4, as point 110.3-$p$. The computer then draws the portion of the new quadratic Bezier curve from point 110.2 to point 110.3-$p$. In some configurations resulting from a drawing, the point 115.2-$p$ may not verify the four conditions of point 115.2 discussed in conjunction with FIGS. 1C-1F. In these configurations, point 105.3 may be used as the control point of the new quadratic Bezier curve in place of point 115.2-$p$ or point 115.2. In some aspects, the point 105.4 may be the last input point in the input provided by the user (e.g., a touch of the touch screen or a mousedown event may be terminated after the input of the point 105.4). In these aspects, the entire new quadratic Bezier curve, rather than the portion of the new quadratic Bezier curve up to point 110.3-$p$ or 110.3 may be displayed on the screen.

In FIGS. 1A-1G, solid lines represent lines that may be displayed on the screen. Dashed lines represent lines or curves that may be stored in the memory of the computer but not displayed on the screen.

FIGS. 1A-1G describe the subject technology in conjunction with a curve that has four input points 105.1-105.4. However, the subject technology may be implemented with any number of input points. For example, a curve may include 100 or 1000 input points. Each additional point, after the first three, may be processed as the fourth point 105.4 was processed above, for example, in conjunction with FIG. 1B or FIG. 1G. In some aspects, points are added to the curve as a finger or stylus is being moved across a screen based on a processing speed of the screen, for example, at a rate of 60 points per second or 120 points per second.

Figure 2:
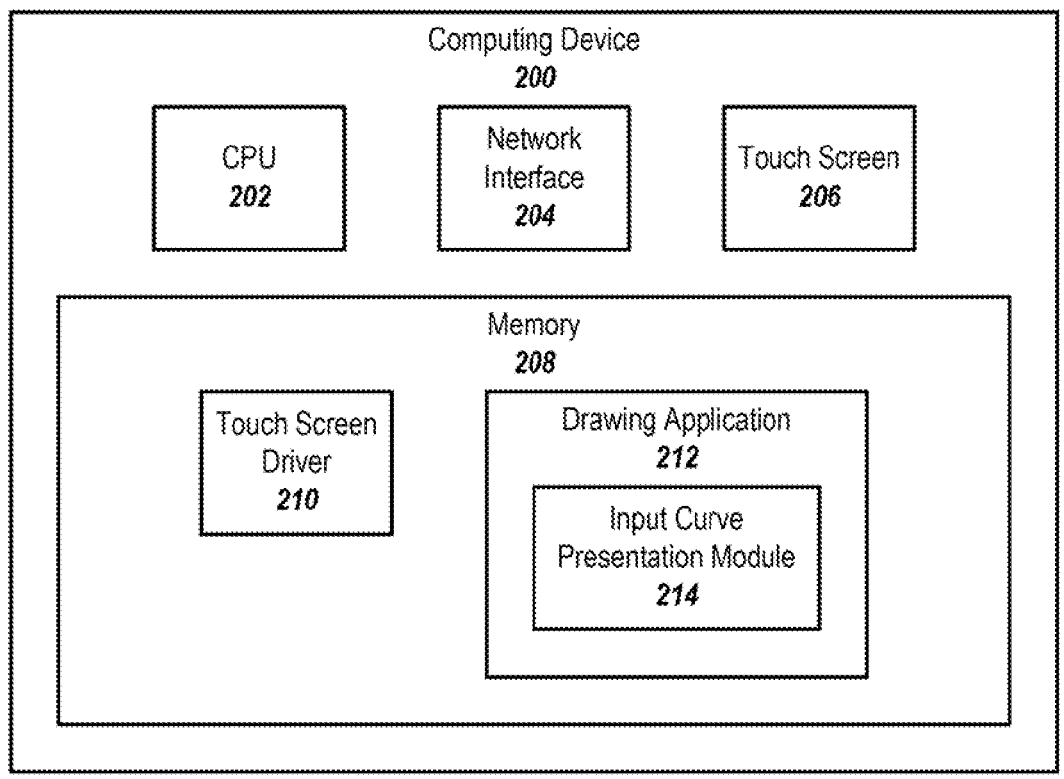
FIG. 2 illustrates an exemplary computing device configured to present a free-form drawing.

FIG. 2 illustrates an exemplary computing device 200 configured to present a free-form drawing. The computing device 200 can be, for example, a laptop computer, a desktop computer, a mobile phone, a personal digital assistant (PDA), a tablet computer, a netbook, a television with one or more processors embedded therein or coupled thereto, a physical machine, or a virtual machine.

As shown, the computing device 200 includes a central processing unit (CPU) 202, a network interface 204, a touch screen 206, and a memory 208. The CPU 202 includes one or more processors. The CPU 202 is configured to execute computer instructions that are stored in a computer-readable medium, for example, the memory 208. The network interface 204 is configured to allow the computing device 200 to transmit and receive data in a network, e.g., the Internet, a wired network, or a wireless network. The network interface 204 may include one or more network interface cards (NICs). The touch screen 206 is configured to receive input via touch. The touch can be completed by an input device, for example, a finger or a stylus. The touch screen 206 may have a single touch interface or a multi-touch interface. The touch screen 206 is also configured to display visual output. The touch screen 206 can be internal to the computing device 200 or the computing device 200 may be coupled with an external touch screen 206. The memory 208 stores data or instructions. The memory 208 may be one or more of a cache unit, a storage unit, an internal memory unit, or an external memory unit. As illustrated, the memory 208 includes a touch screen driver 210 and a drawing application 212. The computing device 200 is described in conjunction with FIG. 2 as including a touch screen 206 and a touch screen driver 210. However, aspects of the subject technology can be implemented in conjunction with a non-touch screen operating in conjunction with an input device other than a finger or stylus, for example, a mouse or a joystick, and with corresponding drivers for the non-touch screen and the input device. In some aspects, movements in two or three dimensional space of an input device (e.g., a finger or a pen) for drawing on the screen can be captured via a camera having an associated driver.

The touch screen driver 210 includes instructions for interfacing with the touch screen 206. For example, the touch screen driver 210 is configured to cause touch data to be input to the computing device 200 via the touch screen 206 and to cause visual output or images to be displayed via the touch screen 206.

The drawing application 212 is an application for drawing image(s) via the touch screen 206. For example, a user could move a finger or a stylus along the touch screen 206 similarly to how a user moves a pen to draw or write on a sheet of paper. The drawing application 212 receives, via the touch screen driver 210, representations of point(s) where the user touches the touch screen 206 and provides an output, via the touch screen, responsive to the received representations of point(s). For example, the drawing application 212 may display a curve connecting the point(s).

As illustrated, the drawing application 212 includes an input curve presentation module 214. The input curve presentation module 214 is configured to receive point(s) touched by the user on the touch screen 206 and to provide for display, via the touch screen 206, a curve corresponding to the point(s) touched by the user. In some examples, the input curve presentation module 214 may operate according to the process 300 described in conjunction with FIGS. 3A-3E, below, or as described above in conjunction with FIGS. 1A-1G.

FIGS. 3A-3E illustrate an exemplary process 300 for presenting a curve in a free-form drawing.

Figure 3A:
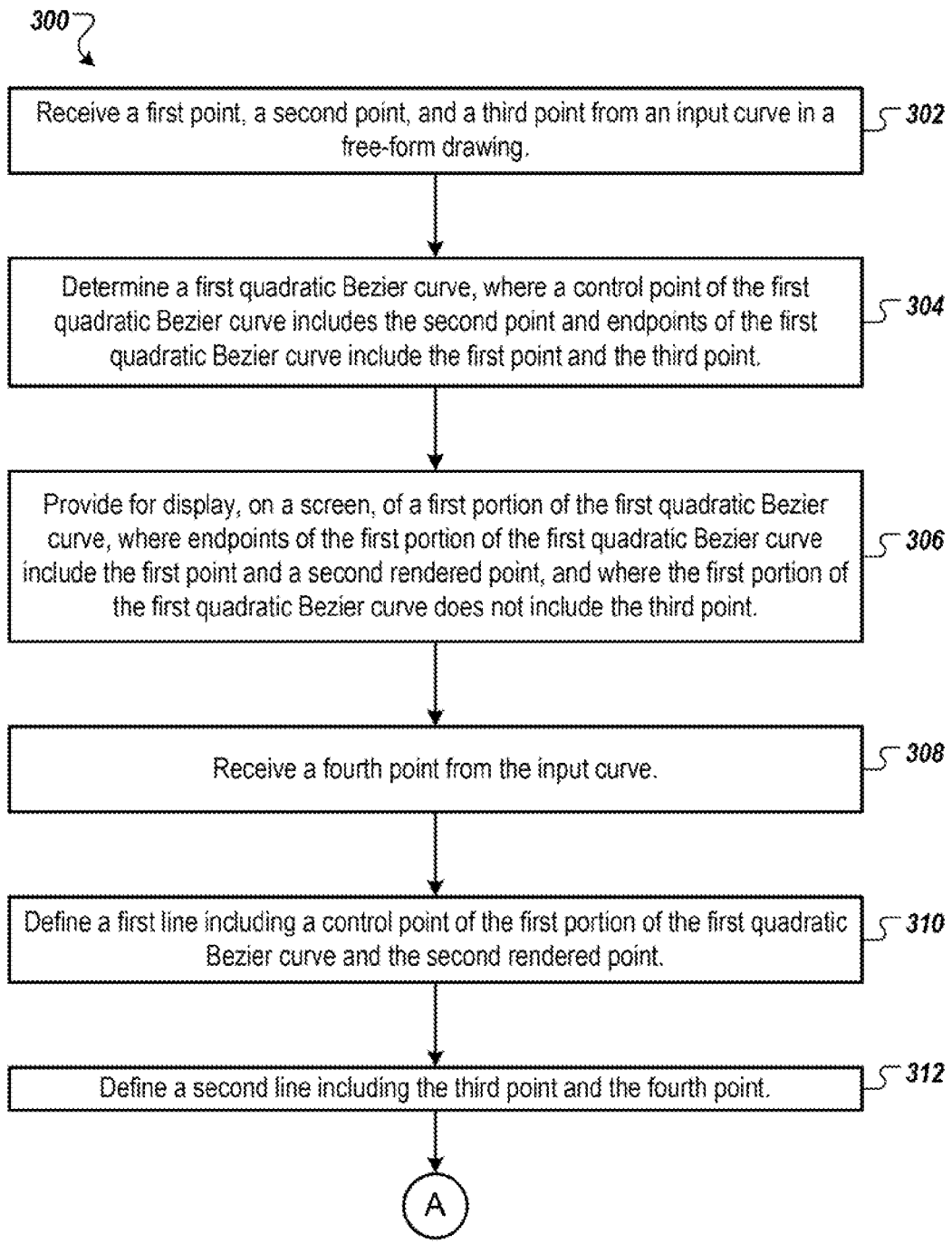
FIGS. 3A-3E illustrate an exemplary process for presenting a curve in a free-form drawing.

As shown in FIG. 3A, the process 300 begins at step 302, where a computer (e.g., computing device 200) receives (e.g., via touch screen 206 or via a mouse), a first point (e.g., point 105.1), a second point (e.g., point 105.2), and a third point (e.g., point 105.3) from an input curve in a free-form drawing. The first point, second point, and third point can correspond to consecutive touches on the touch screen or points on a screen passed by a cursor corresponding to the mouse. The first point can be touched before the second point, which can be touched before the third point. Each touch can be accomplished using any input device for the screen, for example, a finger or a stylus, or using a mouse coupled with a cursor displayed on the screen.

In step 304, the computer determines a first quadratic Bezier curve. The control point of the first quadratic Bezier curve is the second point. The endpoints of the first quadratic Bezier curve are the first point and the third point.

In step 306, the computer provides for display, on a screen, of a first portion of the first quadratic Bezier curve. The endpoints of the first portion of the first quadratic Bezier curve include the first point and a second terminal point (e.g., point 110.2). The first portion of the first quadratic Bezier curve does not include the third point. In some aspects, the second terminal point is the approximate midpoint of the first quadratic Bezier curve.

In step 308, the computer receives a fourth point (e.g., point 105.4) from the input curve from the screen. The fourth point can correspond to a touch on the screen.

In step 310, the computer defines a first line including the control point (e.g., point 115.1) of the first portion of the first quadratic Bezier curve and the second terminal point (e.g., point 110.2).

In step 312, the computer defines a second line including the third point and the fourth point.

Figure 3B:
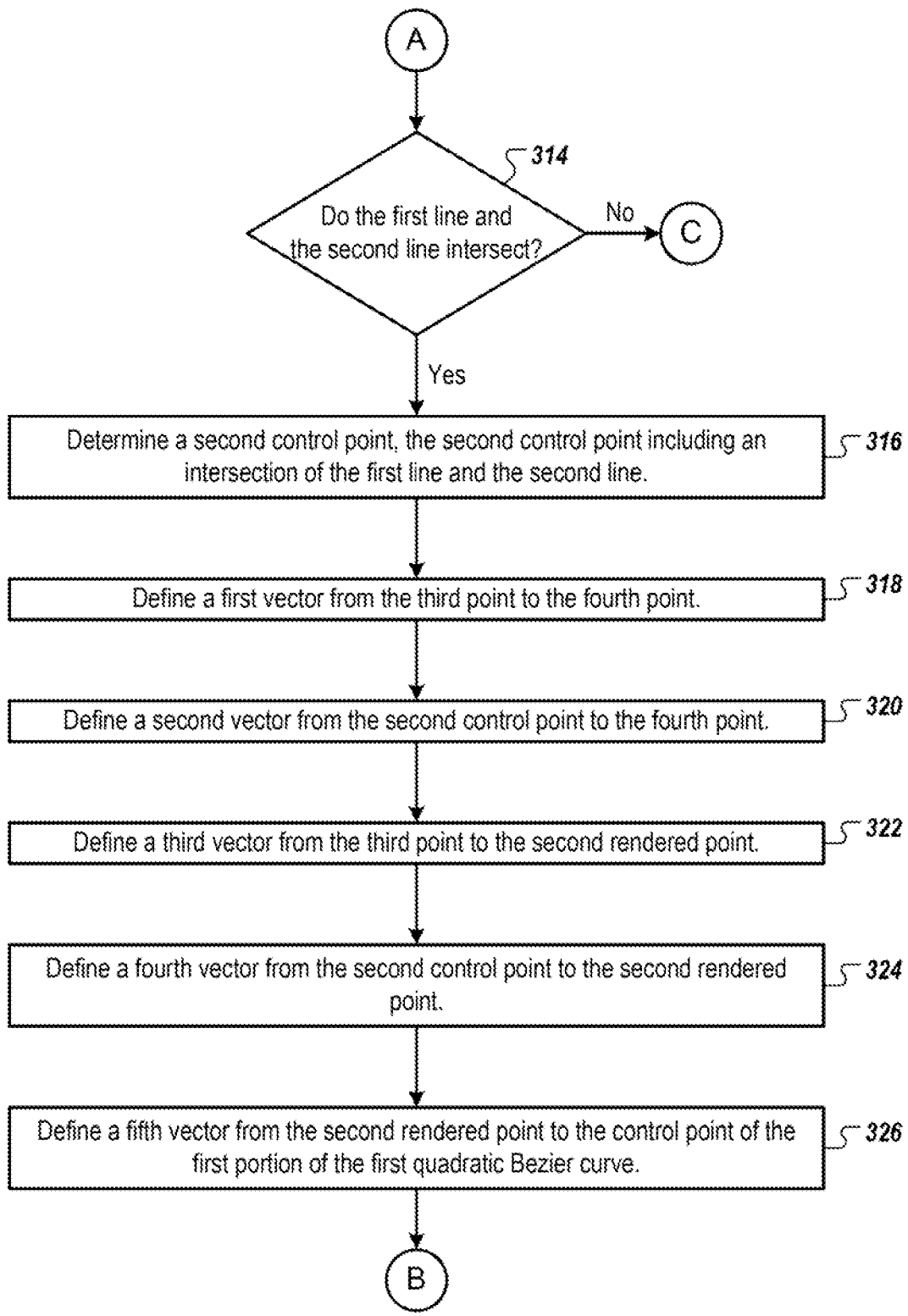

As shown in FIG. 3B, in step 314, the computer determines whether the first line and the second line intersect. If the first line and the second line intersect, the process 300 continues to step 316. If the first line and the second line do not intersect, the process 300 continues to step 336 of FIG. 3D.

In step 316, the computer determines a second control point (e.g., point 115.2). The second control point is at the intersection of the first line and the second line.

In step 318, the computer defines a first vector (e.g., vector 120.1) from the third point to the fourth point.

In step 320, the computer defines a second vector (e.g., vector 120.2) from the second control point to the fourth point.

In step 322, the computer defines a third vector (e.g., vector 120.3) from the third point to the second terminal point.

In step 324, the computer defines fourth vector (e.g., vector 120.4 or vector 120.6) from the second control point to the second terminal point.

In step 326, the computer defines a fifth vector (e.g., vector 120.5) from the second terminal point to the control point (e.g., point 115.1) of the first portion of the first portion of the first quadratic Bezier curve.

Figure 3C:
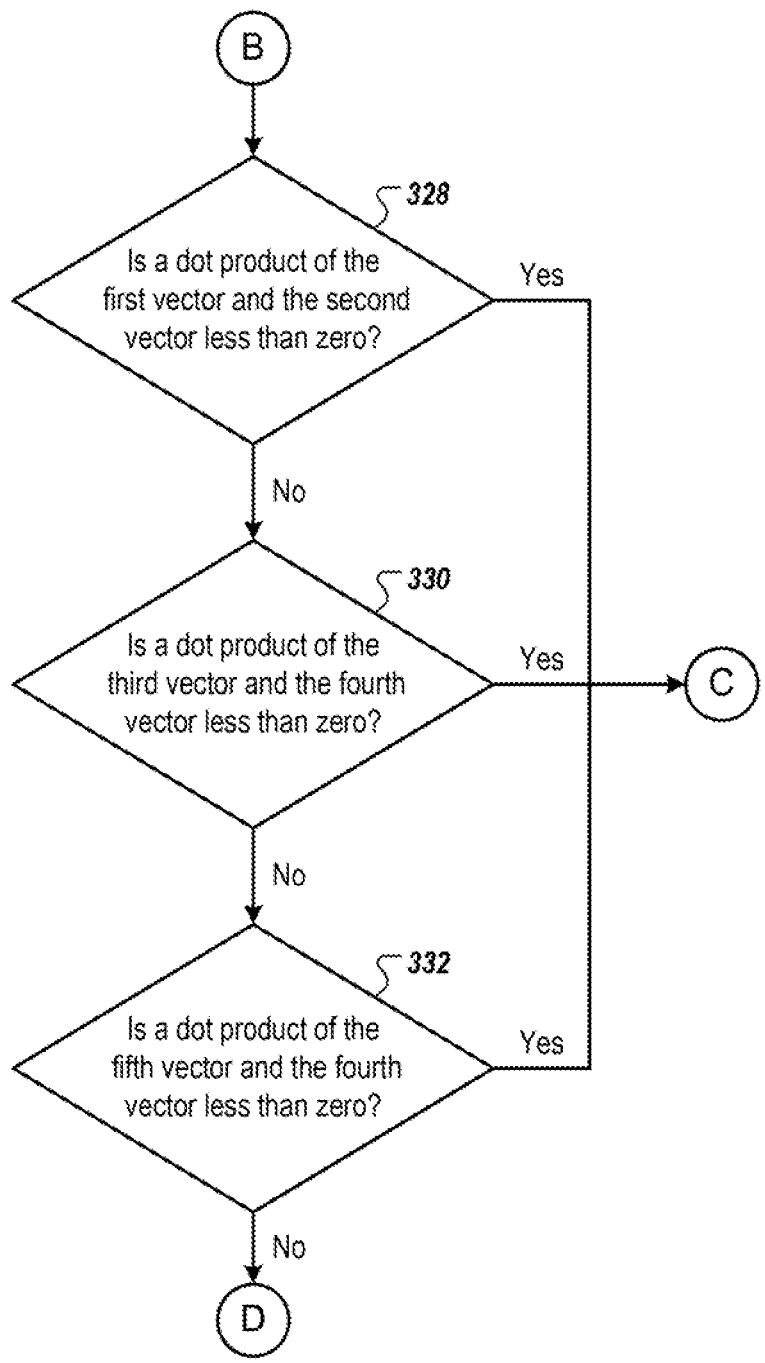

As shown in FIG. 3C, in step 328, the computer determines whether the dot product of the first vector and the second vector is less than zero. If so, the process 300 continues to step 336 of FIG. 3D. If not, the process 300 continues to step 330.

In step 330, the computer determines whether the dot product of the third vector and the fourth vector is less than zero. If so, the process 300 continues to step 336 of FIG. 3D. If not, the process 300 continues to step 332.

In step 332, the computer determines whether the dot product of the fifth vector and the fourth vector is less than zero. If so, the process 300 continues to step 336 of FIG. 3D. if not, the process 300 continues to step 334 of FIG. 3D.

Figure 3D:
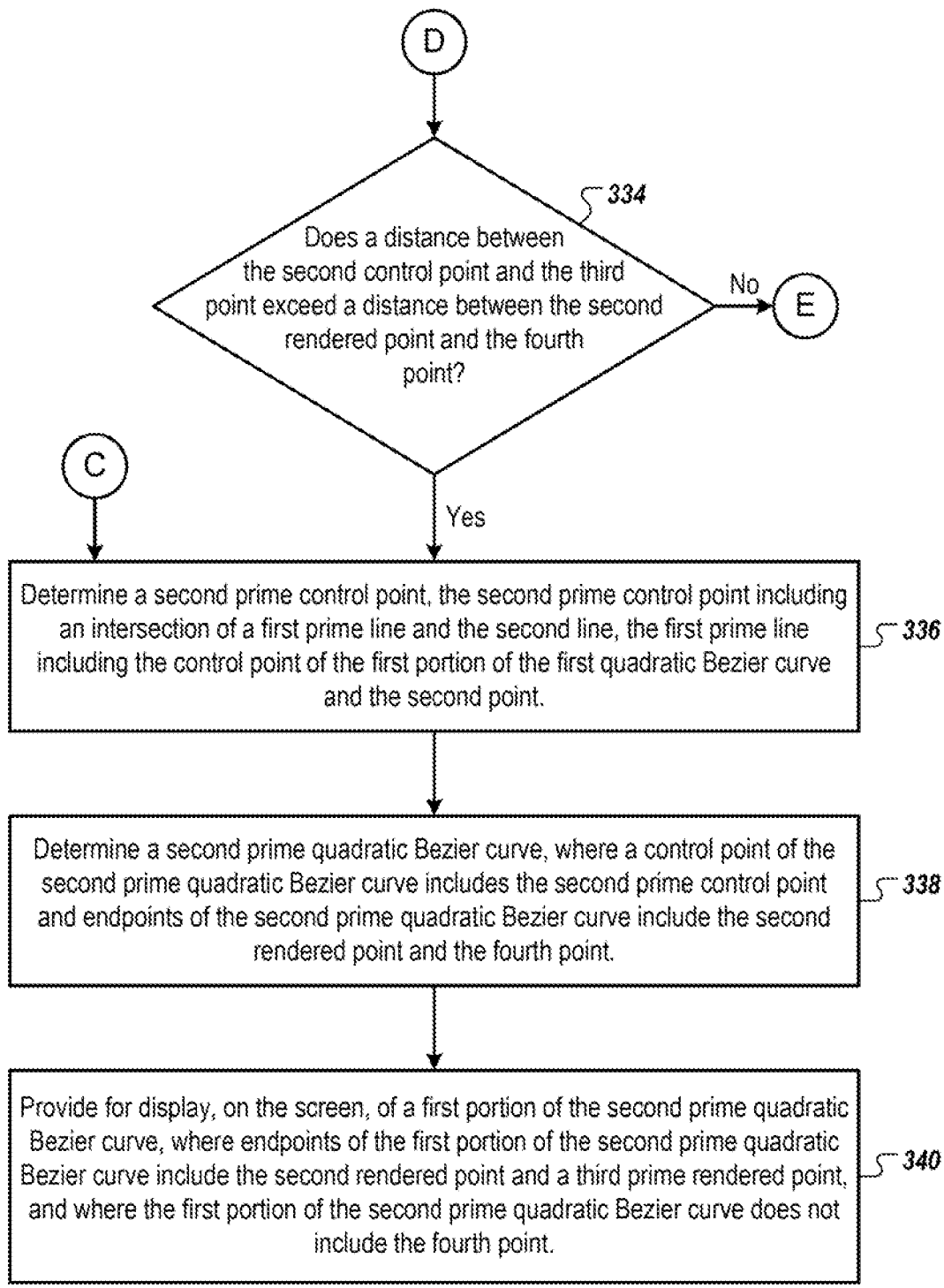

As shown in FIG. 3D, in step 334, the computer determines whether a distance between the second control point and the third control point exceeds a distance between the second terminal point and the fourth point. If so, the process 300 continues to step 336. If not, the process 300 continues to step 342 of FIG. 3E.

In step 336, the computer determines a second prime control point (e.g., point 115.2-*p*). The second prime control point is at the intersection of a first prime line and the second line. The first prime line includes the control point (e.g., point 115.1) of the first portion of the first quadratic Bezier curve and the second point (e.g., point 105.2). The second line, as defined in step 312 of FIG. 3A, includes the third point and the fourth point. In some aspects, the computer may repeat steps 318-334 using the second prime control point in place of the second control point. Upon returning to step 336 in the repetition of steps 318-334 using the second prime control point, the computer may replace the second prime control point with the third point (e.g., point 105.3) from the input curve in the free form drawing, and the third point may serve as the control point for the next Bezier curve, as described below.

In step 338, the computer determines a second prime quadratic Bezier curve. The control point of the second prime quadratic Bezier curve is the second prime control point (e.g., point 115.2-*p*). Endpoints of the second prime quadratic Bezier curve include the second terminal point (e.g., point 110.2) and the fourth point.

In step 340, the computer provides for display, on the screen, of a first portion of the second prime quadratic Bezier curve. The endpoints of the first portion of the second prime quadratic Bezier curve are the second terminal point and a third prime rendered point (e.g., point 110.3-*p*). The first portion of the second prime quadratic Bezier curve does not include the fourth point. In some aspects, the third prime rendered point is the approximate midpoint of the second prime quadratic Bezier curve. After step 340, the process 300 ends.

Figure 3E:
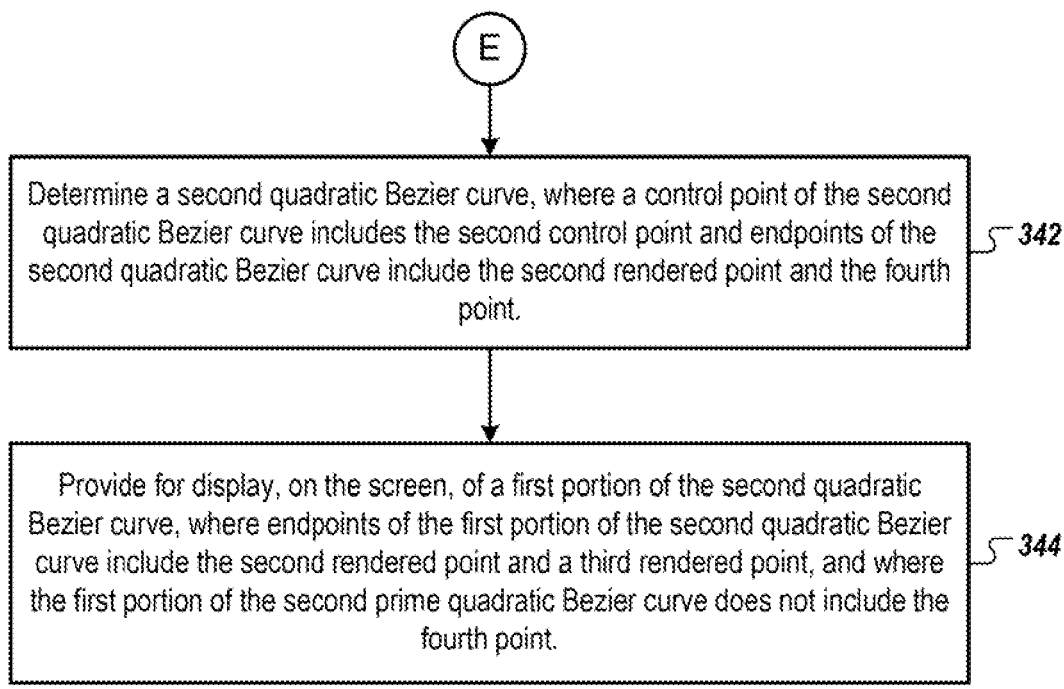

As shown in FIG. 3E, in step 342, if the distance between the second control point and the third control point does not exceed the distance between the second terminal point and the fourth point (as determined in step 334 of FIG. 3D), the computer determines a second quadratic Bezier curve. The control point of the second quadratic Bezier curve is the second control point (e.g., point 115.2). The endpoints of the second quadratic Bezier curve include the second terminal point and the fourth point.

In step 344, the computer provides for display, on the screen, of a first portion of the second quadratic Bezier curve. The endpoints of the first portion of the second quadratic Bezier curve are the second terminal point and a third terminal point (e.g., point 110.3). The first portion of the second quadratic Bezier curve does not include the fourth point. In some aspects, the third terminal point is the approximate midpoint of the second quadratic Bezier curve. After step 344, the process 300 ends.

The process 300 is described in FIGS. 3A-3E as being performed by a single computer. However, in some aspects, multiple computers connected to one another via a network or another connection can implement one or more of the steps of the process 300. For example, the displaying and input receiving steps may be carried out at a client computing device coupled with a screen, while the determining, defining, and calculating steps may be carried out at a server remote to the client computing device.

The steps 302-344 of the process 300 are described as being carried out in series according to a certain order. However, in some aspects, two or more of the steps of the process 300 may be carried out in parallel or the steps of the process 300 may be carried out in any order.

Furthermore, according to some aspects, one or more of the steps 302-344 of the process 300 may be skipped. For example, the process 300 can implement steps 302-312 of FIG. 3A, then skip directly to steps 342-344 of FIG. 3E, without implementing one or more of the steps 314-340, or without implementing each of the steps 314-340.

According to some aspects, one or more of the steps 302-344 of the process 300 may be repeated multiple times. For example, after the fourth point from the input curve is received in step 308 of FIG. 3A, additional point(s) (e.g., a fifth point) may also be received, causing some of the steps 302-344 of the process 300 to be repeated for the additional point(s). When the last input point in the input provided by the user is reached (e.g., when a touch of a touch screen or a mousedown event is terminated), the entire last quadratic Bezier curve, rather than the first portion of the last quadratic Bezier curve is displayed on the screen.

Figure 4:
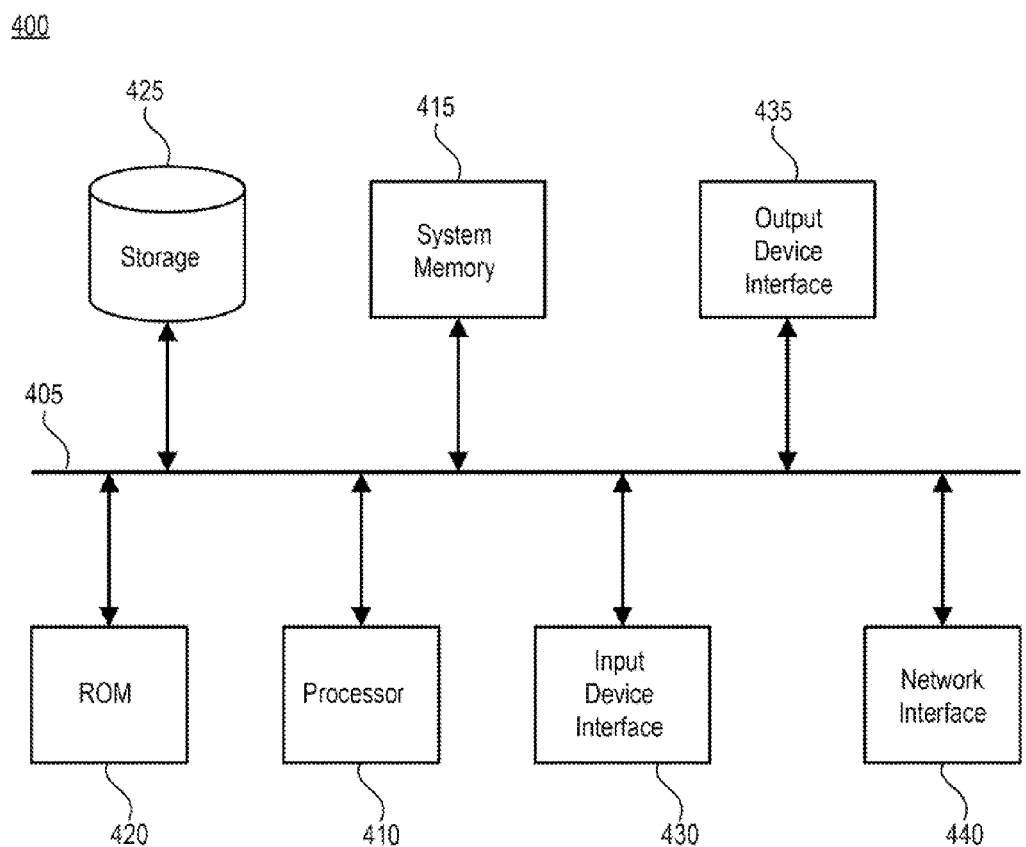
FIG. 4 conceptually illustrates an exemplary electronic system with which some aspects of the subject technology are implemented.

FIG. 4 conceptually illustrates an electronic system 400 with which some aspects of the subject technology are implemented. For example, the computing device 200 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different aspects.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some aspects of the subject technology use a mass-storage device (for example a magnetic or optical disk and its corresponding disk drive) as the permanent storage device 425.

Other aspects use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some aspects, the processes of the subject technology are stored in the system memory 415, the permanent storage device 425, or the read-only memory 420. For example, the various memory units include instructions for presenting a free-form drawing in accordance with some aspects. From these various memory units, the processing unit(s) 410 retrieves instructions to execute and data to process in order to execute the processes of some aspects.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some aspects include devices for example a screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some aspects, multiple software technologies can be implemented as sub-parts of a larger program while remaining distinct software technologies. In some aspects, multiple software technologies can also be implemented as separate programs. Finally, any combination of separate programs that together implement a software technology described here is within the scope of the subject technology. In some aspects, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some aspects include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some aspects are performed by one or more integrated circuits, for example application specific integrated circuits (ASICs) or field programmable gate arrays (FPGAs). In some aspects, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, aspects of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an aspect of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The invention claimed is:

1. A computer-implemented method for presenting a free-form drawing, the method comprising:
   receiving a first point, a second point, and a third point from an input curve in the free-form drawing;
   determining a first quadratic Bezier curve, wherein a control point of the first quadratic Bezier curve comprises the second point and endpoints of the first quadratic Bezier curve comprise the first point and the third point;
   providing for display of a first portion of the first quadratic Bezier curve, wherein endpoints of the first portion of the first quadratic Bezier curve comprise the first point and a second terminal point, and wherein the first portion of the first quadratic Bezier curve does not comprise the third point;
   receiving a fourth point from the input curve;
   determining a second control point, the second control point comprising an intersection of a first line and a second line, the first line comprising a control point of the first portion of the first quadratic Bezier curve and the second terminal point, the second line comprising the third point and the fourth point;
   determining a second quadratic Bezier curve, wherein a control point of the second quadratic Bezier curve comprises the second control point and endpoints of the second quadratic Bezier curve comprise the second terminal point and the fourth point; and
   providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

2. The method of claim 1, wherein the second terminal point comprises a approximate midpoint of the first quadratic Bezier curve, and wherein the third terminal point comprises a approximate midpoint of the second quadratic Bezier curve.

3. The method of claim 1, further comprising:
   receiving a fifth point from the input curve;
   determining a third control point, the third control point comprising an intersection of a third line and a fourth line, the third line comprising a control point of the first portion of the second quadratic Bezier curve and the third terminal point, the fourth line comprising the fourth point and the fifth point;
   determining a third quadratic Bezier curve, wherein a control point of the third quadratic Bezier curve comprises the third control point and endpoints of the third quadratic Bezier curve comprise the third terminal point and the fifth point; and
   providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

4. The method of claim 1, further comprising:
   receiving a fifth point from the input curve;
   determining that a third line and a fourth line do not intersect, the third line comprising a control point of the first portion of the second quadratic Bezier curve and the third terminal point, the fourth line comprising the fourth point and the fifth point;
   determining a third control point, the third control point comprising an intersection of a prime line and the fourth line, the prime line comprising a control point of the first portion of the second quadratic Bezier curve and the third point;
   determining a third quadratic Bezier curve, wherein a control point of the third quadratic Bezier curve comprises the third control point and endpoints of the third quadratic Bezier curve comprise the third terminal point and the fifth point; and
   providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

5. The method of claim 1, further comprising:
   receiving a fifth point from the input curve;
   determining a third control point, the third control point comprising an intersection of a third line and a fourth line, the third line comprising a control point of the first portion of the second quadratic Bezier curve and the third terminal point, the fourth line comprising the fourth point and the fifth point;
determining that a dot product of a first vector and a second vector is less than zero, the first vector being from the fourth point to the fifth point, the second vector being from the third control point to the fifth point;
determining a prime control point, the prime control point comprising an intersection of a third prime line and the fourth line, the prime line comprising a control point of the first portion of the second quadratic Bezier curve and the third point;
determining a third quadratic Bezier curve, wherein a control point of the third quadratic Bezier curve comprises the prime control point and endpoints of the third quadratic Bezier curve comprise the third terminal point and the fifth point; and
providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

6. The method of claim 1, further comprising:
receiving a fifth point from the input curve;
determining a third control point, the third control point comprising an intersection of a third line and a fourth line, the third line comprising a control point of the first portion of the second quadratic Bezier curve and the third terminal point, the fourth line comprising the fourth point and the fifth point;
determining that a dot product of a first vector and a second vector is less than zero, the first vector being from the fourth point to the third terminal point, the second vector being from the third control point to the third terminal point;
determining a prime control point, the prime control point comprising an intersection of a prime line and the fourth line, the prime line comprising a control point of the first portion of the second quadratic Bezier curve and the third point;
determining a third quadratic Bezier curve, wherein a control point of the third quadratic Bezier curve comprises the prime control point and endpoints of the third quadratic Bezier curve comprise the third terminal point and the fifth point; and
providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

7. The method of claim 1, further comprising:
receiving a fifth point from the input curve;
determining a third control point, the third control point comprising an intersection of a third line and a fourth line, the third line comprising a control point of the first portion of the second quadratic Bezier curve and the third terminal point, the fourth line comprising the fourth point and the fifth point;
determining that a dot product of a first vector and a second vector is less than zero, the first vector being from the third terminal point to the control point of the first portion of the second quadratic Bezier curve, the second vector being from the third control point to the third terminal point;
determining a prime control point, the prime control point comprising an intersection of a prime line and the fourth line, the prime line comprising a control point of the first portion of the second quadratic Bezier curve and the third point;
determining a third quadratic Bezier curve, wherein a control point of the third quadratic Bezier curve comprises the prime control point and endpoints of the third quadratic Bezier curve comprise the third terminal point and the fifth point; and
providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

8. The method of claim 1, further comprising:
receiving a fifth point from the input curve;
determining a third control point, the third control point comprising an intersection of a third line and a fourth line, the third line comprising a control point of the first portion of the second quadratic Bezier curve and the third terminal point, the fourth line comprising the fourth point and the fifth point;
determining that a distance between the third control point and the fourth point exceeds a distance between the third terminal point and the fifth point;
determining a prime control point, the prime control point comprising an intersection of a prime line and the fourth line, the prime line comprising a control point of the first portion of the second quadratic Bezier curve and the third point;
determining a third quadratic Bezier curve, wherein a control point of the third quadratic Bezier curve comprises the prime control point and endpoints of the third quadratic Bezier curve comprise the third terminal point and the fifth point; and
providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

9. The method of claim 1 wherein the first point is a first terminal point of the first portion of the first quadratic Bezier curve.

10. The method of claim 1 wherein:
the first point, the second point, the third point, and the fourth point are received via a user input device in numerical order; and
providing for display of the first portion of the first quadratic Bezier curve is performed prior to receiving the fourth point via the user input device.

11. The method of claim 10 wherein:
the user input device includes a touch screen; and
receiving the first point, the second point, the third point, and the fourth point via the user input device includes receiving consecutive touches of the touch screen using one of a finger and a stylus.

12. A non-transitory computer-readable medium for presenting a free-form drawing, the computer-readable medium comprising instructions which, when executed by one or more computers, cause the one or more computers to implement a method, the method comprising:
receiving a first point, a second point, and a third point from an input curve in the free-form drawing;
determining a first quadratic Bezier curve, wherein a control point of the first quadratic Bezier curve comprises the second point and endpoints of the first quadratic Bezier curve comprise the first point and the third point; and providing for display of a first portion of the first quadratic Bezier curve, wherein endpoints of the first portion of the first quadratic Bezier curve comprise the first point and a second terminal point, and wherein the first portion of the first quadratic Bezier curve does not comprise the third point.

13. The computer-readable medium of claim 12, the method further comprising:

receiving a fourth point from the input curve;

determining a second control point, the second control point comprising an intersection of a first line and a second line, the first line comprising a control point of the first portion of the first quadratic Bezier curve and the second terminal point, the second line comprising the third point and the fourth point;

determining a second quadratic Bezier curve, wherein a control point of the second quadratic Bezier curve comprises the second control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

14. The computer-readable medium of claim 13, wherein the second terminal point comprises a approximate midpoint of the first quadratic Bezier curve, and wherein the third terminal point comprises a approximate midpoint of the second quadratic Bezier curve.

15. The computer-readable medium of claim 12, the method further comprising:

receiving a fourth point from the input curve;

determining that a first line and a second line do not intersect, the first line comprising a control point of the first portion of the first quadratic Bezier curve and the second terminal point, the second line comprising the third point and the fourth point;

determining a prime control point, the prime control point comprising an intersection of a prime line and the second line, the prime line comprising a control point of the first portion of the first quadratic Bezier curve and the second point;

determining a second quadratic Bezier curve, wherein a control point of the second quadratic Bezier curve comprises the prime control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

16. The computer-readable medium of claim 12, the method further comprising:

receiving a fourth point from the input curve;

determining a second control point, the second control point comprising an intersection of a first line and a second line, the first line comprising a control point of the first portion of the first quadratic Bezier curve and the second terminal point, the second line comprising the third point and the fourth point;

determining that a dot product of a first vector and a second vector is less than zero, the first vector being from the third point to the fourth point, the second vector being from the second control point to the fourth point;

determining a prime control point, the prime control point comprising an intersection of a prime line and the second line, the prime line comprising a control point of the first portion of the first quadratic Bezier curve and the second point;

determining a second quadratic Bezier curve, wherein a control point of the second quadratic Bezier curve comprises the prime control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

17. The computer-readable medium of claim 12, the method further comprising:

receiving a fourth point from the input curve;

determining a second control point, the second control point comprising an intersection of a first line and a second line, the first line comprising a control point of the first portion of the first quadratic Bezier curve and the second terminal point, the second line comprising the third point and the fourth point;

determining that a dot product of a first vector and a second vector is less than zero, the first vector being from the third point to the second terminal point, the second vector being from the second control point to the second terminal point;

determining a prime control point, the prime control point comprising an intersection of a prime line and the second line, the prime line comprising a control point of the first portion of the first quadratic Bezier curve and the second point;

determining a second quadratic Bezier curve, wherein a control point of the second quadratic Bezier curve comprises the prime control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

18. The computer-readable medium of claim 12, the method further comprising:

receiving a fourth point from the input curve;

determining a second control point, the second control point comprising an intersection of a first line and a second line, the first line comprising a control point of the first portion of the first quadratic Bezier curve and the second terminal point, the second line comprising the third point and the fourth point;

determining that a dot product of a first vector and a second vector is less than zero, the first vector being from the second terminal point to the control point of the first portion of the first quadratic Bezier curve, the second vector being from the second control point to the second terminal point;

determining a prime control point, the prime control point comprising an intersection of a prime line and the second line, the prime line comprising a control point of the first portion of the first quadratic Bezier curve and the second point;

determining a second quadratic Bezier curve, wherein a control point of the second quadratic Bezier curve comprises the prime control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

19. The computer-readable medium of claim 12, the method further comprising:

receiving a fourth point from the input curve;

determining a second control point, the second control point comprising an intersection of a first line and a second line, the first line comprising a control point of the first portion of the first quadratic Bezier curve and the second terminal point, the second line comprising the third point and the fourth point;

determining that a distance between the second control point and the third point exceeds a distance between the second terminal point and the fourth point;

determining a prime control point, the prime control point comprising an intersection of a prime line and the second line, the prime line comprising a control point of the first portion of the first quadratic Bezier curve and the second point;

determining a second quadratic Bezier curve, wherein a control point of the second quadratic Bezier curve comprises the prime control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

20. A system for presenting a free-form drawing, the system comprising:

one or more processors; and a memory comprising instructions which, when executed by the one or more processors, cause the one or more processors to implement a method, the method comprising:

receiving a first point, a second point, and a third point from an input curve in the free-form drawing;

determining a first quadratic Bezier curve, wherein a control point of the first quadratic Bezier curve comprises the second point and endpoints of the first quadratic Bezier curve comprise the first point and the third point;

providing for display of a first portion of the first quadratic Bezier curve, wherein endpoints of the first portion of the first quadratic Bezier curve comprise the first point and a second terminal point, and wherein the first portion of the first quadratic Bezier curve does not comprise the third point;

receiving a fourth point from the input curve;

determining a second control point, the second control point comprising an intersection of a first line and a second line, the first line comprising a control point of the first portion of the first quadratic Bezier curve and the second terminal point, the second line comprising the third point and the fourth point;

determining a second quadratic Bezier curve, wherein a control point of the second quadratic Bezier curve comprises the second control point and endpoints of the second quadratic Bezier curve comprise the second terminal point and the fourth point; and providing for display of a first portion of the second quadratic Bezier curve, wherein endpoints of the first portion of the second quadratic Bezier curve comprise the second terminal point and a third terminal point, and wherein the first portion of the second quadratic Bezier curve does not comprise the fourth point.

21. The system of claim 20, wherein the second terminal point comprises a approximate midpoint of the first quadratic Bezier curve, and wherein the third terminal point comprises a approximate midpoint of the second quadratic Bezier curve.

22. The system of claim 20, the method further comprising:

receiving a fifth point from the input curve;

determining a third control point, the third control point comprising an intersection of a third line and a fourth line, the third line comprising a control point of the first portion of the second quadratic Bezier curve and the third terminal point, the fourth line comprising the fourth point and the fifth point;

determining a third quadratic Bezier curve, wherein a control point of the third quadratic Bezier curve comprises the third control point and endpoints of the third quadratic Bezier curve comprise the third terminal point and the fifth point; and providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

23. The system of claim 20, the method further comprising:

receiving a fifth point from the input curve;

determining that a third line and a fourth line do not intersect, the third line comprising a control point of the first portion of the second quadratic Bezier curve and the third terminal point, the fourth line comprising the fourth point and the fifth point;

determining a third control point, the third control point comprising an intersection of a prime line and the fourth line, the prime line comprising a control point of the first portion of the second quadratic Bezier curve and the third point;

determining a third quadratic Bezier curve, wherein a control point of the third quadratic Bezier curve comprises the third control point and endpoints of the third quadratic Bezier curve comprise the third terminal point and the fifth point; and providing for display of a first portion of the third quadratic Bezier curve, wherein endpoints of the first portion of the third quadratic Bezier curve comprise the third terminal point and a fourth terminal point, and wherein the first portion of the third quadratic Bezier curve does not comprise the fifth point.

* * * * *